United States Patent
Guillez et al.

(10) Patent No.: US 7,093,885 B2
(45) Date of Patent: Aug. 22, 2006

(54) REAR PARCEL SHELF SYSTEM FOR A CONVERTIBLE VEHICLE WITH A HARD FOLDING ROOF

(75) Inventors: Jean-Marc Guillez, Cirieres (FR); Paul Queveau, Montravers (FR); Gerard Queveau, Le Pin (FR)

(73) Assignee: Heuliez, Cerizay (FR)

( * ) Notice: Subject to any disclaimer, the term of this patent is extended or adjusted under 35 U.S.C. 154(b) by 0 days.

(21) Appl. No.: 10/516,802

(22) PCT Filed: Jul. 10, 2003

(86) PCT No.: PCT/FR03/02177

§ 371 (c)(1),
(2), (4) Date: Dec. 2, 2004

(87) PCT Pub. No.: WO2004/009388

PCT Pub. Date: Jan. 29, 2004

(65) Prior Publication Data

US 2005/0248171 A1    Nov. 10, 2005

(30) Foreign Application Priority Data

Jul. 19, 2002 (FR) .................................. 02 09215

(51) Int. Cl.
*B60J 7/00* (2006.01)
(52) U.S. Cl. .............................. 296/107.08; 296/24.44
(58) Field of Classification Search ............. 296/24.44, 296/76, 107.08, 136.03
See application file for complete search history.

(56) References Cited

U.S. PATENT DOCUMENTS

| | | | |
|---|---|---|---|
| 2,992,042 A | 7/1961 | Gilson et al. | |
| 6,010,178 A | 1/2000 | Hahn et al. | |
| 6,092,335 A * | 7/2000 | Queveau et al. | 49/192 |
| 6,145,915 A * | 11/2000 | Queveau et al. | 296/107.08 |
| 6,390,532 B1 | 5/2002 | Mac Farland | |
| 6,454,343 B1 * | 9/2002 | Wagner et al. | 296/107.08 |
| 6,511,118 B1 | 1/2003 | Liedmeyer et al. | |
| 6,796,594 B1 | 9/2004 | Antreich | |
| 6,832,804 B1 | 12/2004 | Eichholz et al. | |
| 6,840,564 B1 | 1/2005 | Heller et al. | |
| 6,863,333 B1 * | 3/2005 | Heller et al. | 296/107.09 |
| 2004/0017092 A1 | 1/2004 | Antreich | |
| 2004/0017093 A1 | 1/2004 | Heller et al. | |
| 2004/0036312 A1 | 2/2004 | Eichholz et al. | |
| 2004/0124660 A1 | 7/2004 | Heller et al. | |
| 2005/0236855 A1* | 10/2005 | Queveau et al. | 296/24.4 |
| 2005/0280279 A1* | 12/2005 | Obendiek et al. | 296/107.07 |
| 2006/0001286 A1* | 1/2006 | Queveau et al. | 296/37.1 |

FOREIGN PATENT DOCUMENTS

DE    44 45 941 C1    3/1996

* cited by examiner

*Primary Examiner*—Kiran B. Patel
(74) *Attorney, Agent, or Firm*—Bachman & LaPointe

(57) ABSTRACT

The invention relates to a rear parcel shelf system for a convertible vehicle with a hard folding roof. The system has a first retractable shelf. The inventive system also has a second shelf which is intended to be disposed under the bonnet of the rear boot when the roof is in the closed position and has a device for moving and guiding the second shelf towards the front of the vehicle in order to fill the space between the back of the corresponding seats and the front edge of the bonnet when the roof is in the folded position.

12 Claims, 7 Drawing Sheets

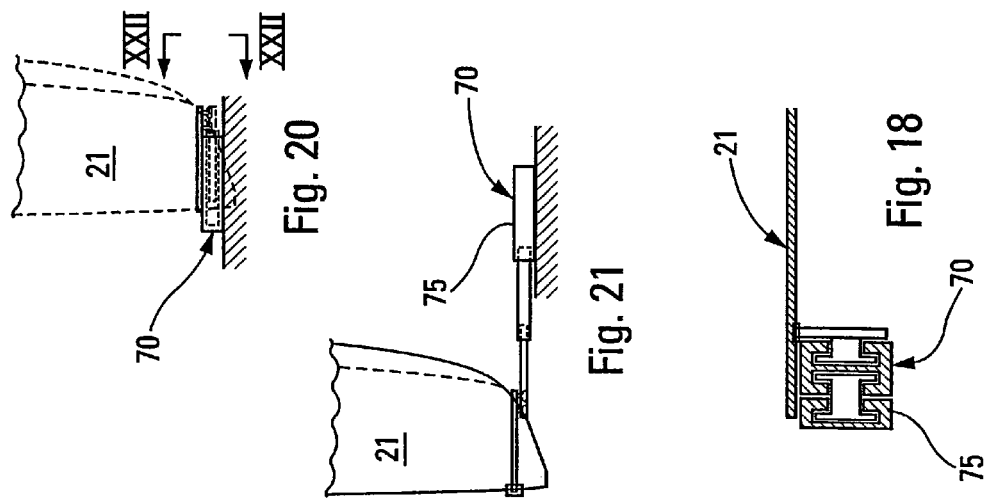
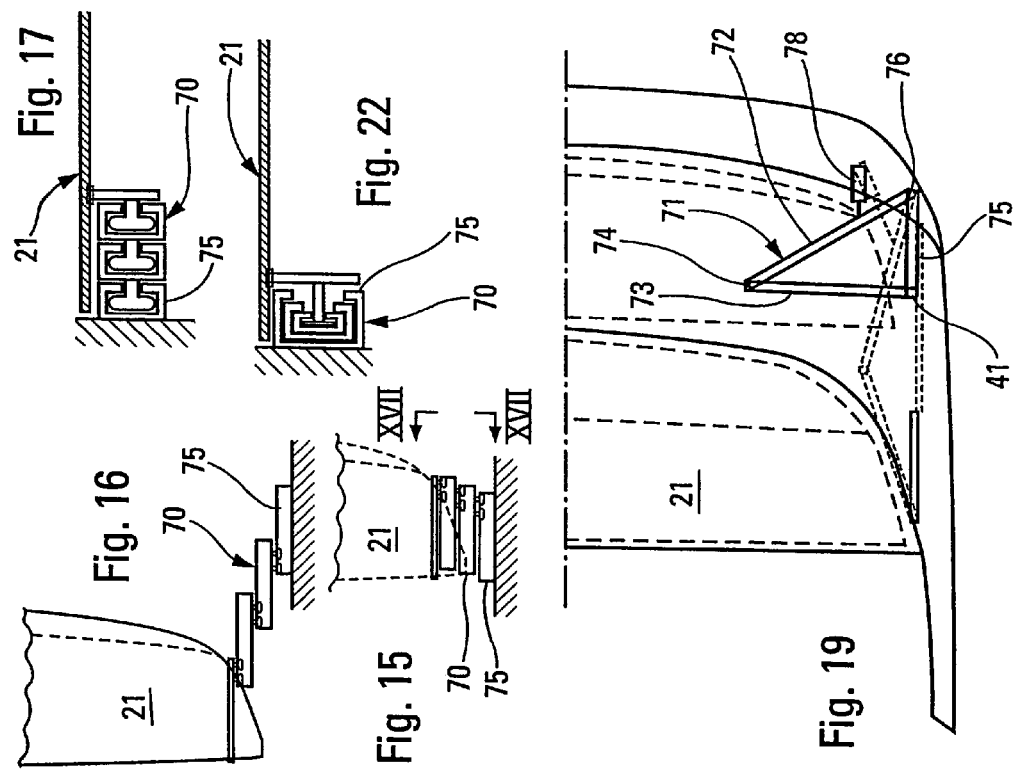

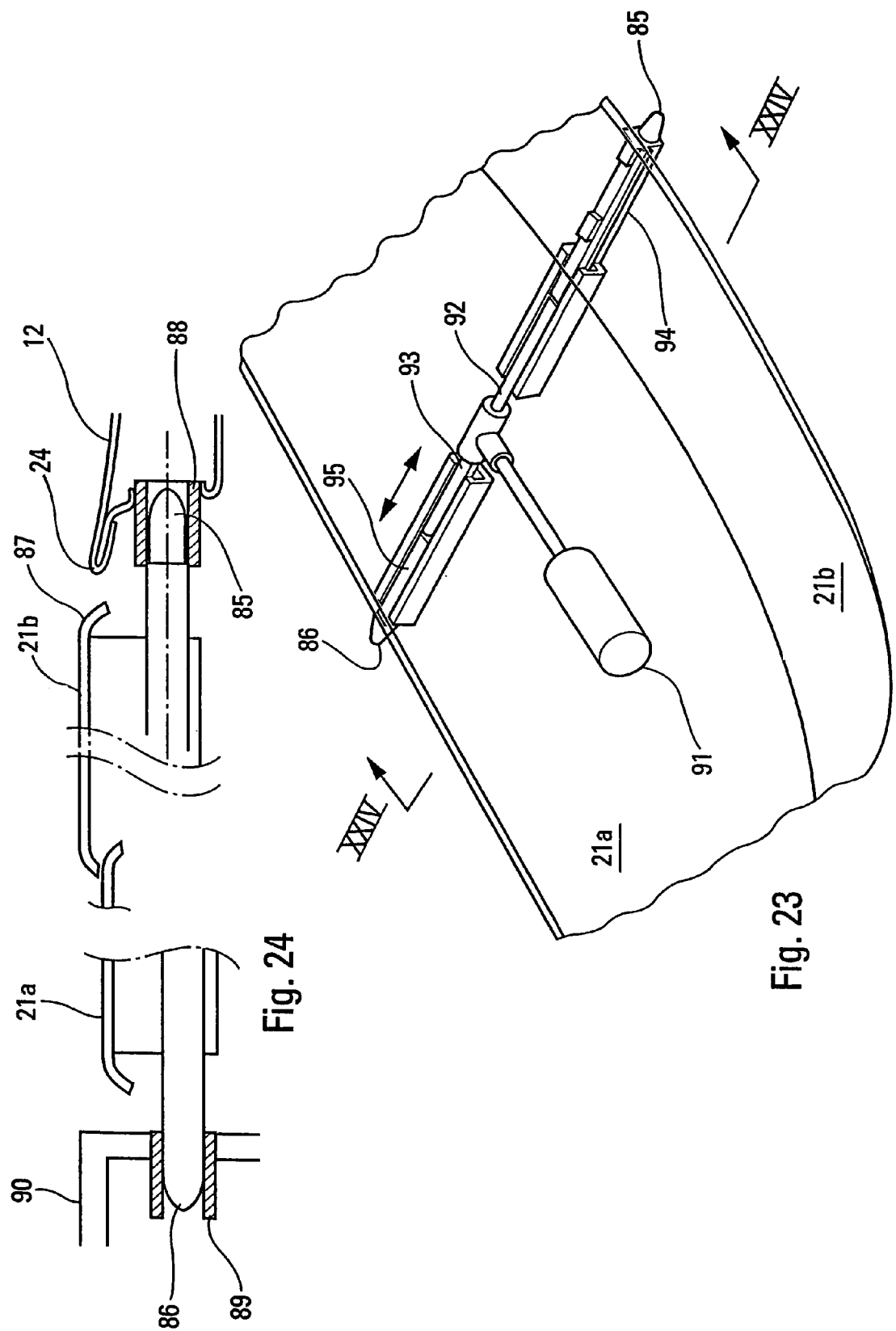

REAR PARCEL SHELF SYSTEM FOR A CONVERTIBLE VEHICLE WITH A HARD FOLDING ROOF

BACKGROUND OF THE INVENTION (1) Field of the Invention

The present invention relates to a rear package shelf system for a convertible vehicle with a hard roof, which may be folded away into a trunk, and to a vehicle equipped with such a system.

(2) Prior Art

This system conventionally comprises a shelf, or tray adapted for covering in its normal position, the space located behind the back of the corresponding seats, and means for displacing this shelf between its normal position and a retracted position to allow the passing the components of the roof toward their folded position inside the rear trunk of the vehicle.

This shelf, which is brought back to its substantially horizontal normal position after the passing of the components of the roof in one direction or in the other, generally has a rear edge which extends to the front edge of the hood of the rear trunk of the vehicle, and which is therefore located under the rear edge of the roof rear component when the roof is in its closed position.

Such a package shelf system does not give entire satisfaction to certain users who deplore the presence of a certain play between the shelf and the rear edge of the rear roof component in this closed position of the roof corresponding to the two-door sedan configuration of the vehicle.

If the shelf is limited to the rear edge of the rear roof component, a space remains between the shelf and the front edge of the hood of the rear trunk when the roof is in its folded position in the rear trunk.

SUMMARY OF THE INVENTION

The object of the present invention is to find a remedy to the drawbacks of the known package shelf systems and to provide a rear parcel system of the aforementioned type capable of completely covering the space located behind the back of the seats, both in the two-door sedan configuration and in the convertible configuration of the vehicle.

According to the present invention, the rear package shelf system of the aforementioned type is characterized in that it includes a second shelf, or tray, attached to said hood, underneath it, and adapted to be positioned, above the passenger compartment of the vehicle in the closed position of the roof, entirely under this hood, and means for displacing and guiding said second shelf toward the front of the vehicle so as to fill up, in the folded position of the roof, the space between the back of the corresponding seats and the front edge of said hood, by then protruding at least partly out of the latter.

Thus, the first shelf is adapted to completely cover the space located between the back of the seats when the vehicle is in the two-door sedan configuration, whereas the second shelf is adapted to completely cover said space when the vehicle is in the convertible configuration, wherein the roof is folded inside the rear trunk.

According to another important feature, the hood is adapted so that it may pivot both forwards and rearwards, at least partly, via the front and rear pivot groups, adapted to cause this hood to pivot from the rear to the front in order to access the inside of the trunk or from the front to the rear in order to store the roof in at least one portion of this trunk, respectively, in a folded condition of the roof, whereby the second shelf is attached to said hood, underneath it and movable with respect to it, preferably through translation. This enhances the functionality and quality of transformable vehicles, allowing for more performing solutions than on vehicles of the "barrel" type.

According to an advantageous version of the present invention, the first shelf is mounted so as to pivot upwards and rearwards around an axis located near the rear edge so as to be adapted to its being stored under the rear roof component when the roof is in its folded position. This configuration allows the roof to be folded into the rear trunk even if said trunk already contains baggage.

According to an interesting version of the present invention, the second shelf on each side of the vehicle is firmly attached to a carriage moving along a respective guiding unit extending substantially longitudinally under the hood of the rear trunk, and the second shelf is mounted relatively to each carriage via means adapted for allowing the rear of the second shelf to move upwards so as to be pressed against the front edge of the hood when the second shelf reaches close to its extended position.

Other features and advantages of the present invention will become apparent in the description detailed hereafter.

BRIEF DESCRIPTION OF THE DRAWINGS

In the appended drawings, only given as non-limiting examples:

FIG. 15 is a partial top view schematically illustrating another embodiment of the means for displacing and guiding the second shelf, the second shelf being in its stored position inside the trunk;

FIG. 16 is a similar view to FIG. 15, the second shelf being in its extended position;

FIG. 17 is a schematic view along XVII—XVII in FIG. 15;

FIG. 18 is a similar view to FIG. 17, illustrating an alternative embodiment of the device of FIG. 17;

FIG. 19 is a partial top view of another embodiment of the means for displacing and guiding the second shelf;

FIG. 20 is a view of a detail from FIG. 19, the second shelf being in its stored position under the hood of the rear roof of the vehicle;

FIG. 21 is a similar view to FIG. 20, the second shelf being in its extended position;

FIG. 22 is a schematic sectional view along XXII—XXII in FIG. 20;

FIG. 23 is a perspective view of another embodiment of the second shelf according to the present invention, the second shelf being in its extended position;

FIG. 24 is a schematic view along XXIV—XXIV in FIG. 3;

DETAILED DESCRIPTION OF THE PREFERRED EMBODIMENTS

A convertible vehicle 1 equipped with a folding hard roof 2 comprising a rear roof component 3 and at least one front roof component 4, is schematically illustrated in FIGS. 1 to 5.

Figure 1:
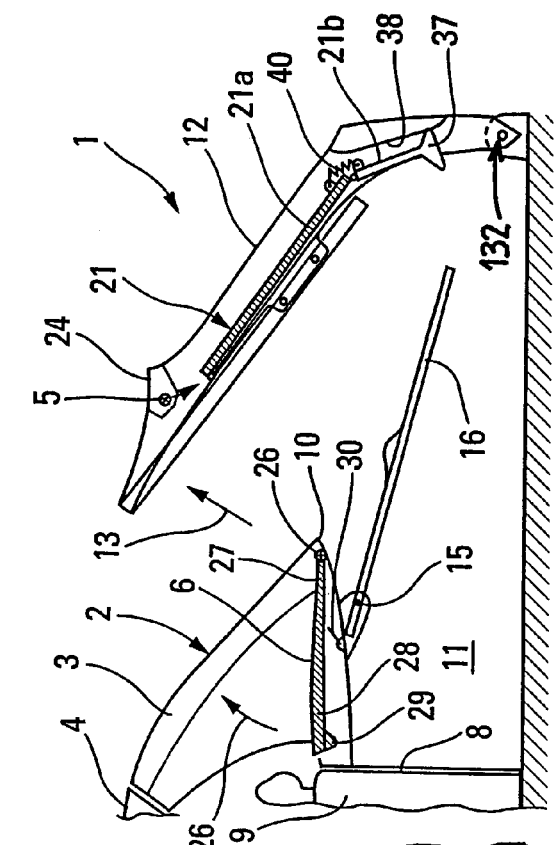
FIG. 1 is an elevational view with a cutaway of the rear portion of a vehicle equipped with a rear package shelf system according to an embodiment of the present invention, the roof being in its extended closed position and the hood of the rear trunk being in its closed position.
Figure 2:
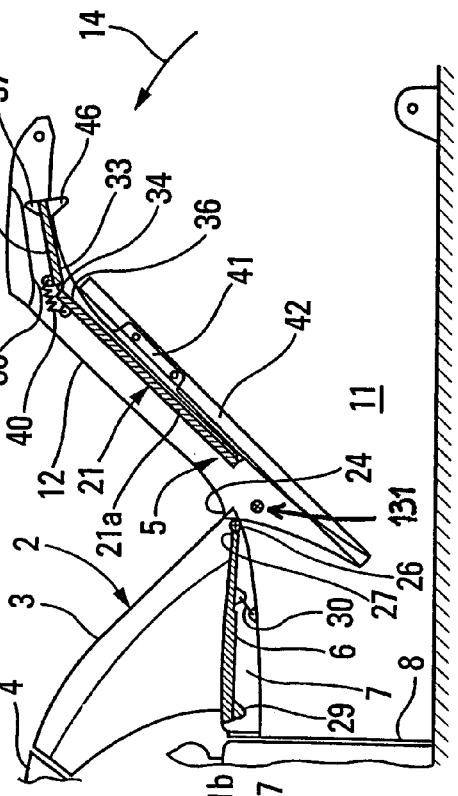
FIG. 2 is a similar view to FIG. 1, the hood of the rear trunk being open in the forward to rearward direction in order to allow the roof to pass from its folded position inside the trunk.
Figure 3:
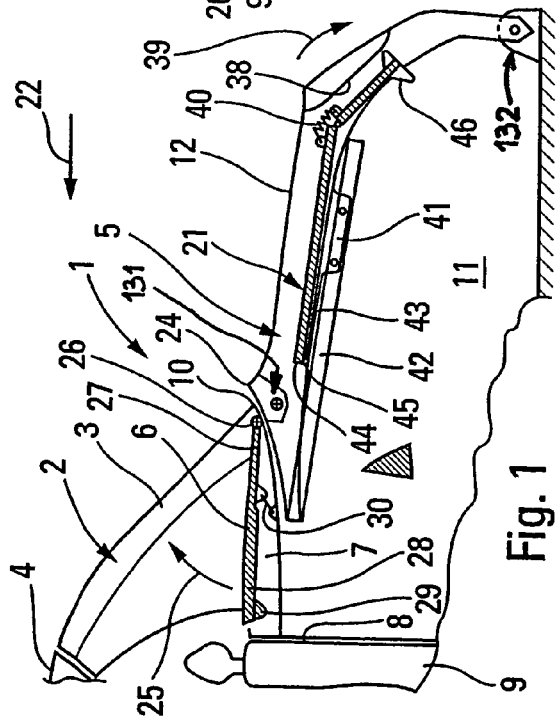
FIG. 3 is a similar view to FIG. 1, the hood of the rear trunk being in its open position in the rearward to forward direction in order to allow baggage to be loaded in the trunk.

Vehicle 1 is equipped with a rear package shelf system 5 comprising a first shelf 6 adapted to cover, in its normal position which corresponds to the closed position of the roof illustrated in FIGS. 1 to 3, the space 7 between the back 8 of the corresponding seats 9 and the lower rear edge 10 of the rear roof component 3.

The rear package shelf system 5 further comprises means known per se, for moving the first shelf 6 toward a retracted position so as to allow the components 3, 4 of the roof 2 to pass toward their folded position inside the rear trunk 11 of vehicle 1.

The rear trunk 11 is closed by a hood 12 which, in the illustrated example, may open from the front toward the rear, in the direction of the arrow 13, as illustrated in FIG. 2, to allow the roof components 3, 4 to pass through up to their folded position inside the rear trunk 11.

The hood 12 may also be opened from the rear to the front as schematized in FIG. 3, in the direction of the arrow 14, to provide access to the rear trunk 11 from the rear of the vehicle for loading and unloading baggage and other loads.

To allow this dual forward or rearward pivoting of the hood, the latter therefore comprises front and rear pivot groups adapted to cause this rear trunk hood to respectively pivot from the rear to the front and from the front to the rear, according to the individual case.

A hood of this type is known from French patent FR-B-2,777,241, in the name of the applicant, wherein each pivot group is a lock the function of which is either locking or the jointing of the hood so that the latter may be opened either from the front to the rear, or from the rear to the front. This solution is applicable here.

Another rear trunk hood of the aforementioned type is also known from French patent application FR 0201232, as of Feb. 01, 2002.

Figure 27:
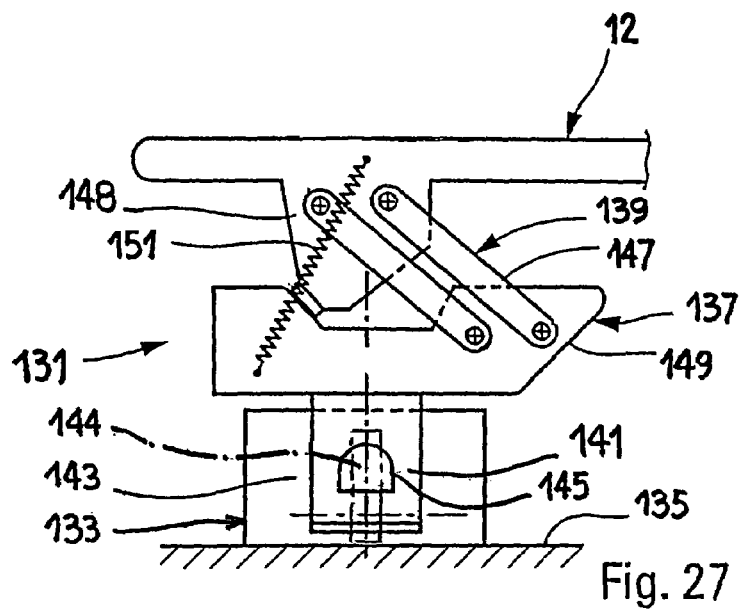
FIG. 27 schematically shows a pivot/lock system for a hood pivoting in both directions.

Two front pivot/lock assemblies or groups (the diagram of one 131 of them is in FIG. 27) are adapted therein in order to cause the hood 12 of the rear trunk to pivot from the rear to the front and two rear pivot/lock assemblies 132 (which may be identical with 131) are adapted therein in order to cause said hood to pivot from the front to the rear. Each of these pivot assemblies comprises a base 133 fixed to the body 135 of the vehicle, a body 137 which is connected to the hood 12 of the rear trunk by a hinge-forming member 139 and which comprises a first assembly component 141 adapted so as to be removably received by a second assembly component 143 with a complementary shape, being part of the corresponding base 133. Locking means, for example with hooks, (schematized for one of them at 144) lock the body 137 in its locked position relatively to the base. The hooks 144, which advantageously are powered, are pivotably mounted on the base and are adapted for engaging with a complementary support conformation 145 of the first assembly component 141 so as to be supported on this conformation 145 and to guide the end of the pivoting motion of the hood up to the corresponding locked position.

Moreover, the hinge-forming member 139 of each pivot assembly comprises two substantially parallel connecting rods 147 jointed at one end on the hood 12 (internal protrusion 148) and at their other end on an arm 149 firmly attached to the first corresponding assembly component.

Preferably, a return spring 151 is placed between the hood and the corresponding body 137 to return the hood to its closed position.

Figure 28:
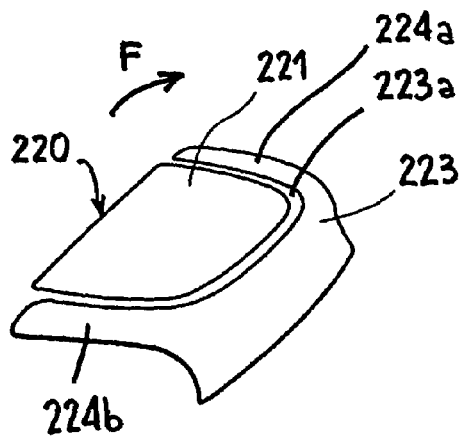
FIGS. 28 and 29 show a trunk hood with two jointed portions.
Figure 29:
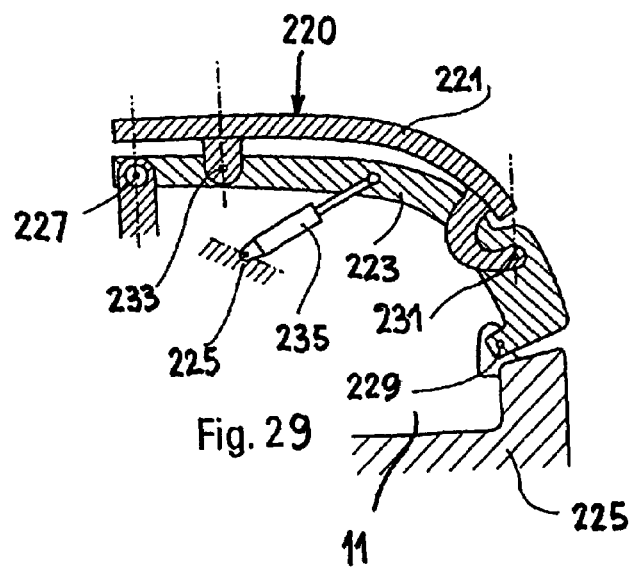

In this example, the hood 12 is one single part, but it may be formed by at least two hood portions, as schematically shown at 220 in FIGS. 28 and 29. Such a hood may be formed by two components 221, 223 firmly attached to each other in the case when the hood opens from the rear to the front.

One 221 of these components is separable from the other in order to allow it to pivot from the front to the rear (see arrow F of FIG. 28).

The assembly formed by both components 221, 223 is firmly attached to the chassis 225 of the vehicle on the one hand, by a joint 227 located at the front of the hood, allowing this assembly to rotate from the rear to the front, and, on the other hand by a lock 229 located at the rear of the hood allowing it to be locked on this same chassis. Component 221 is jointed on the second component 223 along an axis 231 located close to the rear of the second component and is locked to this second component 223 by a sliding lock 233 located close to the front of both components.

It is seen in FIG. 28 that the first component covers a recess 223a provided at the front in the second component, which thus has two side lugs 224a, 224b extending axially, when the hood is closed.

The pivoting of component 5 along axis 10 located close to the rear of the other component 6 may be controlled (see FIG. 4) by a motor 12 driving a toothed segment 13 firmly attached to the first component 5.

The pivoting of component 221 may be controlled by a cylinder 235.

To access the trunk 11, lock 229 is unlocked and the baggage compartment formed by both components 221, 223 locked together by lock 233 is lifted. The baggage compartment is thereby pivoted from the rear to the front.

When the intention is to store away the roof 2 in the trunk, the (preferably motorized) lock 233 is unlocked. The control is actuated in order to cause the component 221 to pivot from the front to the rear, thereby clearing recess 223a.

In the example of FIGS. 1 and 2, the rear roof component 3 is adapted so as to be stored away by sliding it into the rear trunk 11, and it includes at least a roller 15 adapted so as to move along a slide 16 firmly attached to the body of the vehicle, the front roof component 4 being guided toward the inside of the trunk 11 by adapted means known per se and not illustrated.

The present invention may also be adapted to the case of a folding roof comprising a rear roof component pivotably mounted with respect to the body of the vehicle 1.

Figure 4:
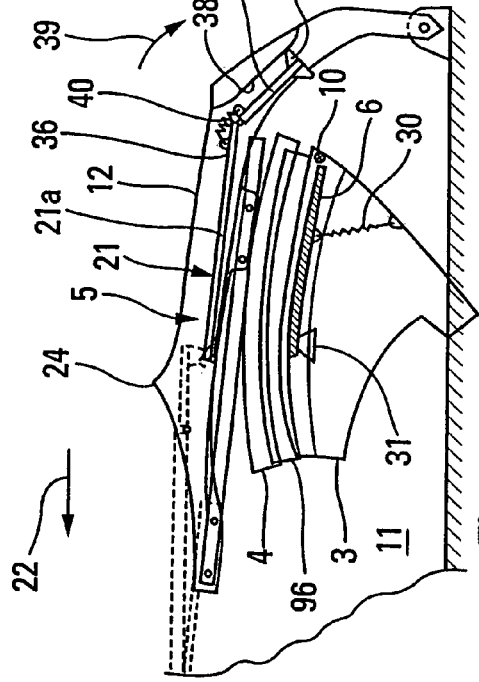
FIG. 4 is a partial view similar to FIG. 1, the roof being in its extended position inside the rear trunk of the vehicle.

According to the present invention, the rear package shelf system 5 includes a second shelf 21 adapted so as to be positioned, in the closed position of the roof illustrated in FIGS. 1 to 3, underneath the hood 12 of the rear trunk 11, as well as means for moving and guiding the second shelf 21 toward the front of the vehicle, in the direction of the arrow 22, in order to fill, in the folded position of the roof, notably illustrated in FIG. 4, the space 23 between the back 8 of the corresponding seats 9 and the front edge 24 of the hood 12.

The extended position of the second shelf 21 is schematized by dashes in FIG. 4.

The second shelf 21 is thus longer, in the longitudinal direction of the vehicle 1, as schematized by the arrow 22, than the first shelf 6.

In the illustrated example, the first shelf 6 is mounted so as to pivot upwards and rearwards, in the direction of the arrow 25, relatively to the rear roof component 3, around a schematized axis at 26 and located near its rear edge 27 so as to be adapted to being stored under the rear roof component 3, in particular under the rear window (not illustrated), when the roof 2 is in its folded position of FIG. 4.

In this example, the first shelf 6 in its normal horizontal position illustrated in FIGS. 1 to 3, lies with its front edge 28 on at least one stop 29 and is permanently urged in this position resting against stop 29, by a spring, schematized at 30, firmly attached to the rear roof component 3.

In the folded position of the roof as illustrated in FIG. 4, the first shelf 6 is held back by a second stop 31 which forces it to pivot toward the rear roof component 3 against the action of spring 30 (see FIG. 4).

The use of other known configurations of the retracted shelf may also be contemplated for the first shelf 6.

The second shelf 21 in the longitudinal direction 22 of the vehicle may have a larger dimension than the corresponding dimension of the hood 12 of the rear trunk 11.

In such a case, the second shelf 21 includes a front component 21a and a rear component 21b mobile relatively to the front component 21a so that the second shelf 21 is completely housed underneath the hood 12.

The rear parcel system 5 then includes means adapted for moving the rear component 21b relatively to the front component 21a when the second shelf 21 is moved toward the rear, in the direction of the arrow 32, toward its stored position underneath the hood 12, and for putting back into place said rear component 21b substantially aligned with the front component 21a when the second shelf 21 is moved forward, in the direction of the arrow 22, toward its extended position.

Advantageously, the rear component 21b is pivotably or slidably mounted onto the rear end of the front component 21a.

In the embodiment illustrated in FIGS. 1 to 4 and 6 and 7, the rear component 21b is jointed at its front end 33 on an axis 34 parallel to the transverse direction 35 of the vehicle 1 (see FIG. 5) and is borne by the rear edge 36 of the front component 21a of the second shelf 21.

The rear component 21b bears on its upper face and on its rear edge, an outgrowth 37 adapted to slide along the cam surface 38 fixed under the hood 12 and extended downwards and rearwards to force the rear component 21b to pivot downwards, in the direction of the arrow 39, when the second shelf 21 is moved toward the rear of the vehicle toward its stored position under the hood 12, against the action of an antagonistic spring 40 which is positioned so as to permanently load the rear component 21b in a position aligned with the front component 21a.

In this embodiment of FIGS. 1 to 4 and 6 and 7, the second shelf 21 on each side of the vehicle 1 is firmly attached to a carriage 41 moving along a respective guiding unit 42 substantially extending under the hood 12 of the rear trunk 11 longitudinally.

In this example, the carriage 41 includes an arm 43 forwardly extending as a cantilever, relatively to the carriage 41, up to the front edge of the front component 21a of the second shelf 21. The arm 43 bears at its front end, an axis 45 parallel to the transverse direction 35 and on which the front edge 44 of the second shelf 21 is jointed.

The rear component 21b of the second shelf 21 bears on its lower surface of its rear edge, a feeler component 46 adapted to contact a second cam surface 47 when the second shelf 21 arrives close to its extended position.

Figure 7:
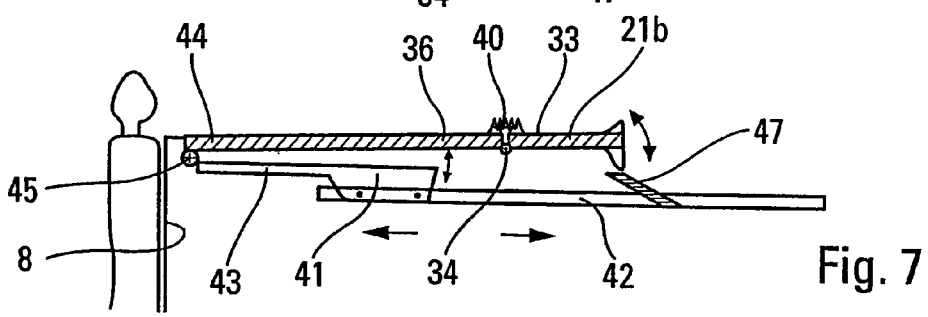
FIG. 7 is a similar view to FIG. 6, the second shelf being in its extended position.

The second cam surface 47 is conformed so that the rear component 21b, already urged by the antagonistic spring 40, is forcibly held aligned with the first component 21a, and the whole of the second shelf 21 is lifted from the rear so that it pivots around the axis 45 until it is positioned in the sought-after substantially horizontal position, illustrated in FIG. 7, when the second shelf 21 has arrived in its extended position, the carriage 41 being substantially at the front end of the guiding unit 42.

Of course, the spring 40 and the axis 45 are positioned in such a way that the rear component 21b is permanently urged toward its position aligned with the front component 21a.

Thus, the second shelf 21 is mounted relatively to each carriage 41 via means adapted to allow a forward displacement of the rear of the second shelf 21 in order to press said rear against the front edge 24 of the hood 12 when the second shelf reaches close to its extended position and has arrived in this position.

Many other configurations are possible for fulfilling the same functions.

Figure 8:
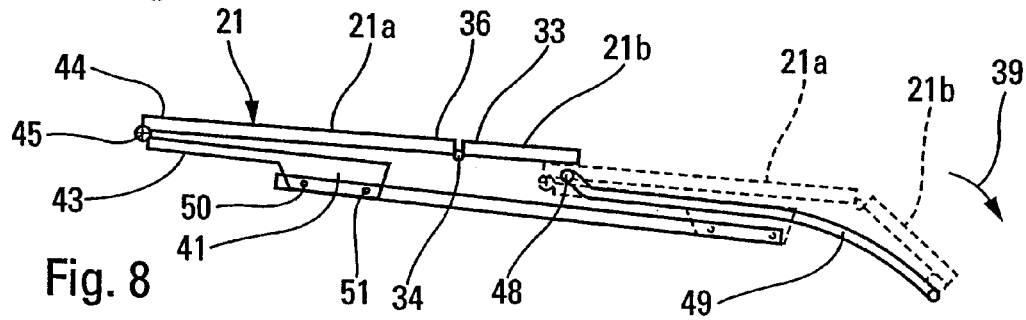
FIG. 8 is a similar view to FIG. 7 of another embodiment of the means for displacing and guiding the second shelf.

In the embodiment of FIG. 8, the rear component 21b bears on its lower face, a finger, schematized at 48, engaged in a substantially Z-shaped slide 49 borne by the hood 12 for guiding, as follows, the second shelf 21 from its extended position, illustrated in solid lines, to its stored position underneath the hood 12, illustrated in dashed lines: a first section, directed rearwards and downwards allows the second shelf 21 to be moved away from the front edge 24 of the hood 12; a second section substantially parallel to the guiding unit 42 allows the second shelf 21 to be moved underneath the hood 12; a last section again directed rearwards and downwards, forces the rear component 21b to pivot downwards, in the direction of the arrow 39, as described earlier, relatively to the front component 21a.

In this example, the guiding unit 42 is a slide in which rollers 50, 51 borne by the carriage 41 come and slide.

Figure 11:
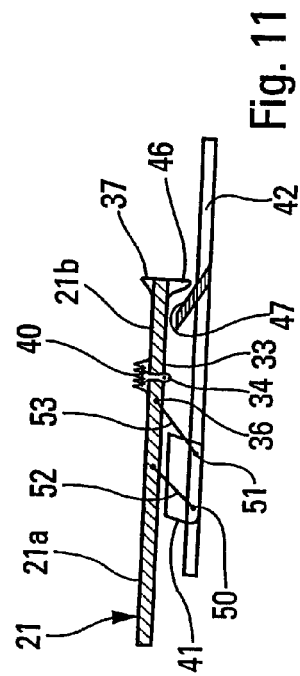
FIG. 11 is a schematic view of another embodiment of the means for displacing and guiding the second shelf, the latter being in the position illustrated in FIG. 6.
Figure 12:
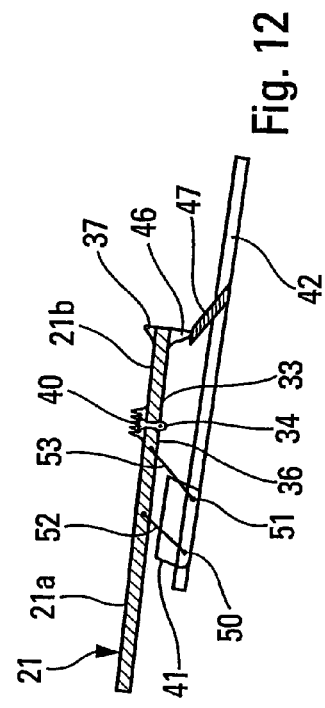
FIG. 12 is a similar view to FIG. 11, the second shelf being in the position illustrated in FIG. 7.

In the example illustrated in FIGS. 11 and 12, the front component 21a of the second shelf 21 is jointedly connected to one end of both joint arms 52, 53, each jointed at their other end on the carriage 41. When the second shelf 21 comes close to its extended position, the feeler 46 cooperates with the second cam surface 47 to cause the rear of the second shelf 41 to pivot upwards.

Figure 9:
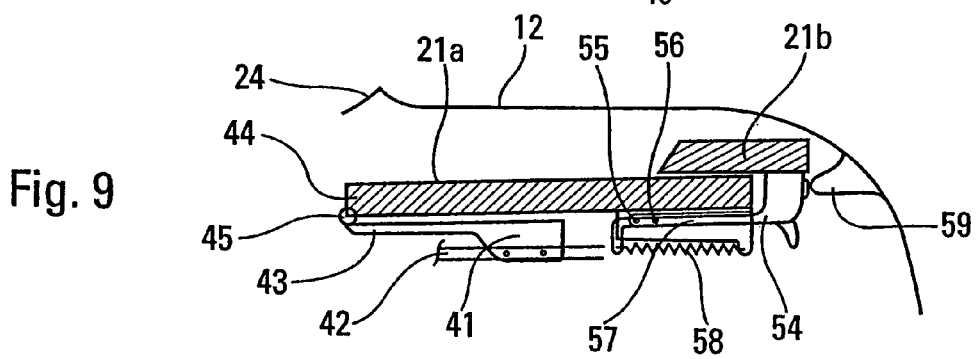
FIG. 9 is a partial view of another embodiment of the second shelf according to the present invention, the second shelf being illustrated in its position stored under the hood of the rear trunk.
Figure 10:
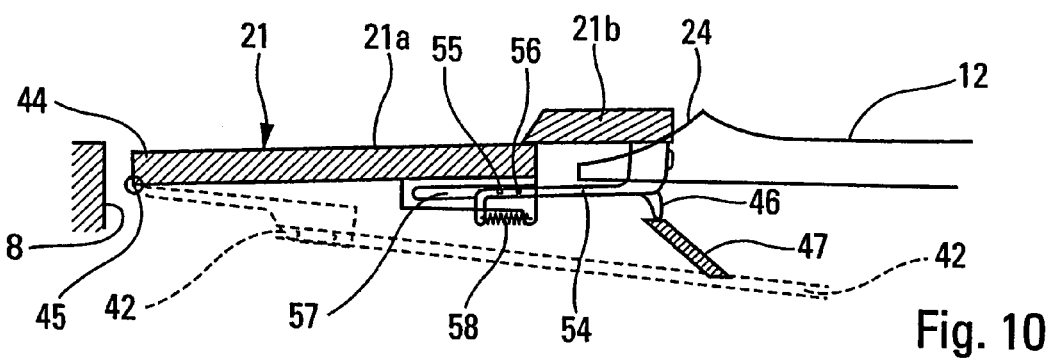
FIG. 10 is a similar view to FIG. 9, the second shelf being illustrated in its extended position.

In the embodiment of FIGS. 9 and 10, the rear component 21b of the second shelf 21 bears an arm 54 extending as a cantilever toward the front of the vehicle. The arm 54 bears two rollers 55, 56 adapted to slide in a slide 57 borne by the front component 21a of the second shelf 21. A spring 58 mounted between the rear component 21b and the front component 21a permanently urges the rear component toward the rear of vehicle. In its stored position underneath the hood 12, illustrated in FIG. 9, the rear component 21b is in contact with a stop 59 borne by the hood 12 which forces the rear component 21b to take up a forwardly slided position relatively to the front component 21a, against the action of the spring 58, in order to limit the total longitudinal dimension of the second shelf 21.

In the extended position of the second shelf 21 illustrated in FIG. 10, the rear component 21b urged by the spring 58 takes up a rearwardly receded position relatively to the front component 21a. The feeler 46 sliding along the second cam surface 47 has forced the second shelf 21 to pivot relatively to axis 45 in order to take up its final substantially horizontal extended position as disclosed above.

In the example illustrated in FIGS. 1 to 13, the guiding unit 42 is formed by a one-piece rail or slide with a length at least equal to the distance over which the second shelf 21 must travel between its stored position underneath the hood 12 and its extended position.

Figure 14:
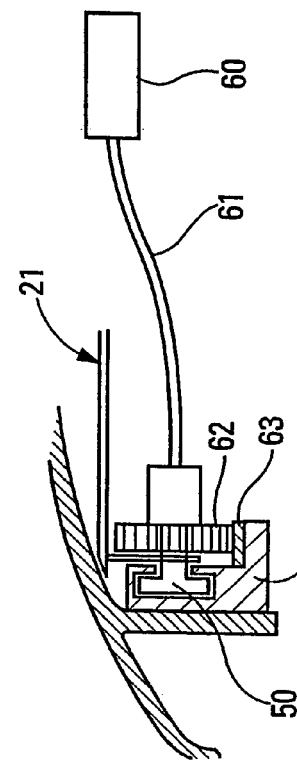
FIG. 14 is a schematic sectional view along XIV—XIV in FIG. 13.
Figure 5:
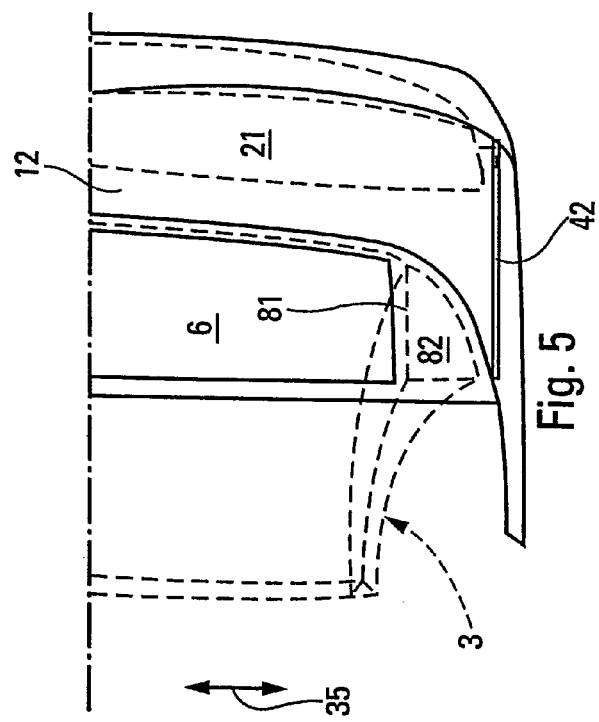
FIG. 5 is a top view of the vehicle rear portion illustrated in FIG. 1.
Figure 13:
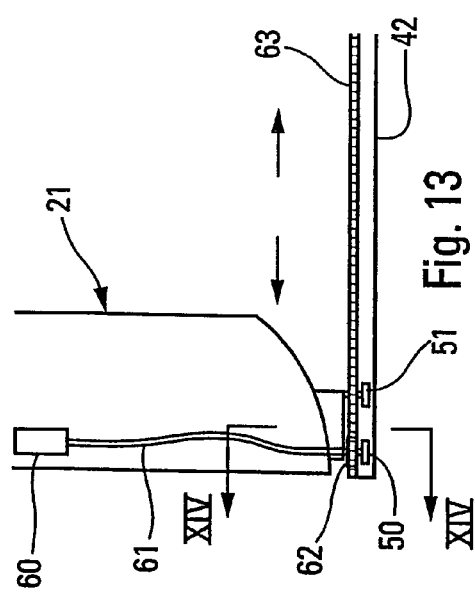
FIG. 13 is a schematic top view of another embodiment of the means for displacing and guiding the second shelf.
Figure 6:
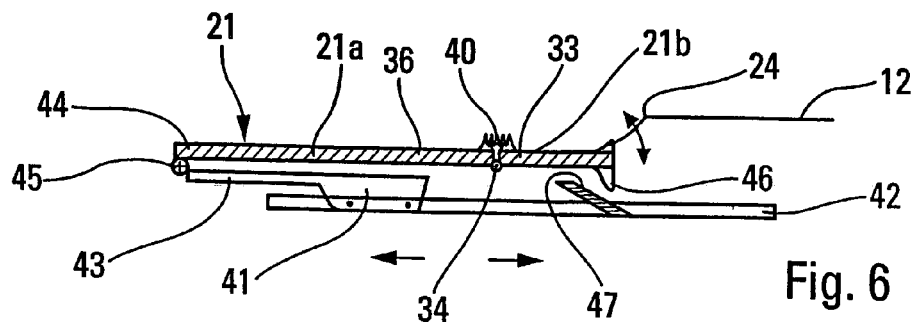
FIG. 6 is an enlarged partial view of a detail from FIG. 1 illustrating the means for displacing and guiding the second shelf, schematized on FIGS. 1 to 4, the second shelf being in a position close to its extended position.

Each carriage 41 is driven along the corresponding guiding unit 42 by any known means. In the example illustrated in FIGS. 13 and 14, a motor 60 is fixed under the front component 21a of the second shelf 21 and is connected, for example through a flex 61, to a cogwheel 62 adapted for meshing with a rack 63 firmly attached to the guiding unit 42.

In the embodiments of FIGS. 15 to 22, the guiding unit 42 is formed by a telescopic arm 70 comprising at least two sections that allow the second shelf 21 to be moved from the front to the rear and from the rear to the front. In the illustrated examples, the telescopic arm 70 includes three sections with a general C-shaped cross-section, which may be nested within each other in various known ways, wherein the front component 21a of the second shelf 21 may be fixed onto the last section or may be mobile relatively to said last section.

In the example of FIGS. 15 to 17, each section is positioned outside the adjacent sections, each section having its aperture directed toward the inside of the vehicle.

In the example of FIG. 18, two sections have their respective apertures turned toward each other.

In the example of FIGS. 20 to 22, each section is adapted for sliding within the preceding section.

In order to move the front component 21a of the shelf 21 from its stored position underneath the hood 12 to its extended position and vice versa, a jointed arm 71 includes a first leg 72 and a second leg 73 connected to each other by a vertical axis 74 of rotation in order to form a deformable pair of calipers.

The free end of the first leg 72 is fixed onto the rear end of the first section 75 of the telescopic arm 70 through a vertical axis 76 of rotation.

The free end of the second leg 73 is fixed on the front of the carriage 41 through a vertical axis 77 of rotation.

The jointed arm 71 is for example actuated by a cylinder 78 fixed under the hood 12 of the rear trunk 11 and connected to the first leg 72 of the jointed arm 71.

It will be noted that the first shelf 6 has a transverse dimension, in the transverse direction 35 of the vehicle 1, corresponding to the space available between the respective interior trims 81 of the rear side panels 82.

On the contrary, the second shelf 21 in this same transverse direction 35 must have a dimension larger than that of the first shelf 6 in order to be able to cover the freed space by the rear side panels 82 in the folded position of the roof 2.

In the embodiment of FIGS. 23 and 24, the second shelf 21 includes means for locking said shelf 21 or both front and rear components 21a, 21b, relatively to the body of the vehicle when the second shelf 21 is in its extended position, the vehicle being in the convertible configuration. Indeed, such a lock is required in order to enable the second shelf 21 to withstand more or less heavy loads usually positioned on said second shelf.

In the embodiment of FIGS. 23 and 24, the second shelf 21 bears at least two locking fingers 85, 86.

When the second shelf is in its extended position, a first locking finger 85, located on the rear edge 87 of the rear component 21b, becomes locked in a first striker 88 fixed on the front edge 24 of the hood 12 of the rear trunk 11.

A second locking finger 86, located on the front edge 44 of the front component 21a, becomes locked into a second striker 89 firmly attached to a cross-member 90 of the vehicle located behind the backs 8 of the corresponding seats 9.

A motor 91 borne by the second shelf 21, by the front component 21a here, drives threaded rods 92, 93 into rotation which, by rotating, longitudinally move in opposite directions, nuts 94, 95, bearing fingers 85 and 86, respectively.

Advantageously, the fingers 85, 86 have their ends with a tapered shape so as to provide a centering function relatively to the strikers 88 and 89.

As schematized in FIG. 24, this embodiment exclusively corresponds to the embodiment of FIGS. 9 and 10 wherein the rear component 21b is slidably mounted at the rear of the front component 21a. The rear component 21b may thereby be fixed on the rear nut 95 and the motor 91 be used to cause the rear component 21b to slide relatively to the front component 21a.

Several locking fingers 85 and several locking fingers 86 may obviously be available. Locking fingers moving in the transverse direction 35 of the vehicle may also be provided. Of course, the present invention is not limited to the embodiments that have just been described, and many changes and alterations may be made to the latter embodiments without departing from the scope of the invention.

Everything above which pertains to a second shelf with two components 21a, 21b is transposable without any modification to a second one-piece shelf 21. The present invention is also applicable in the case of a folding roof comprising more than two roof components. A roof comprising a third intermediate component 96 inserted between both rear 3 and front 4 components described above is thereby illustrated in FIG. 4. In such a case, the seats 9 may be the rear seats of the vehicle.

Finally, the guiding and driving means described above may be replaced with any equivalent known means. So, motors driving shafts and cogwheels or worms or cables or flexes, electric, pneumatic or hydraulic cylinders, or even hand cable controls may be used as driving means.

The first shelf 6 may be retracted by means other than those described above. The first shelf may thus pivot downwards around a transverse axis fixed on the back 8 of the seats 9.

Figure 25:
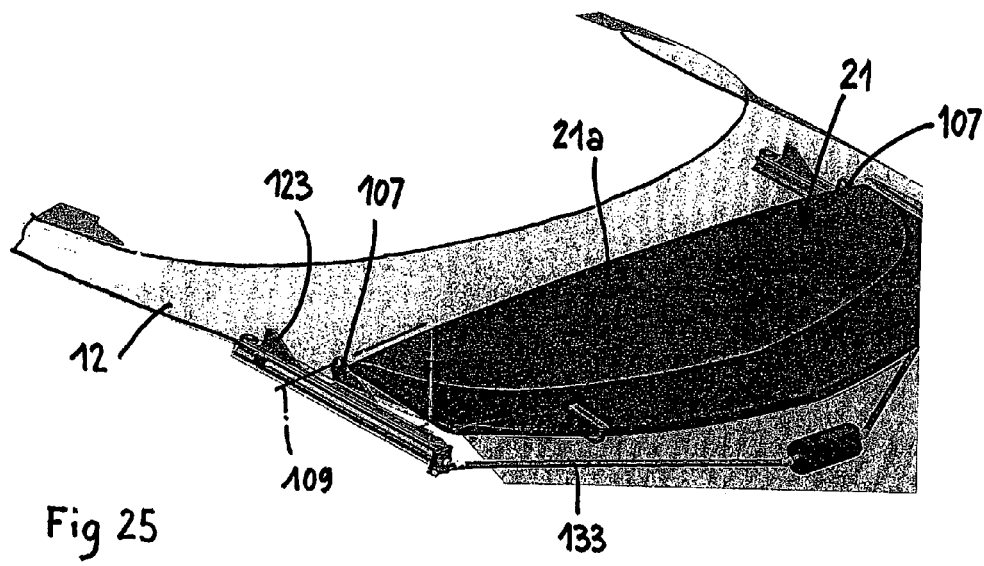
FIGS. 25 and 26 show with a see-through effect, an alternative embodiment of a second dual shelf driven by telescopic side arms (rearward retracted and forward extended positions, respectively)
Figure 26:
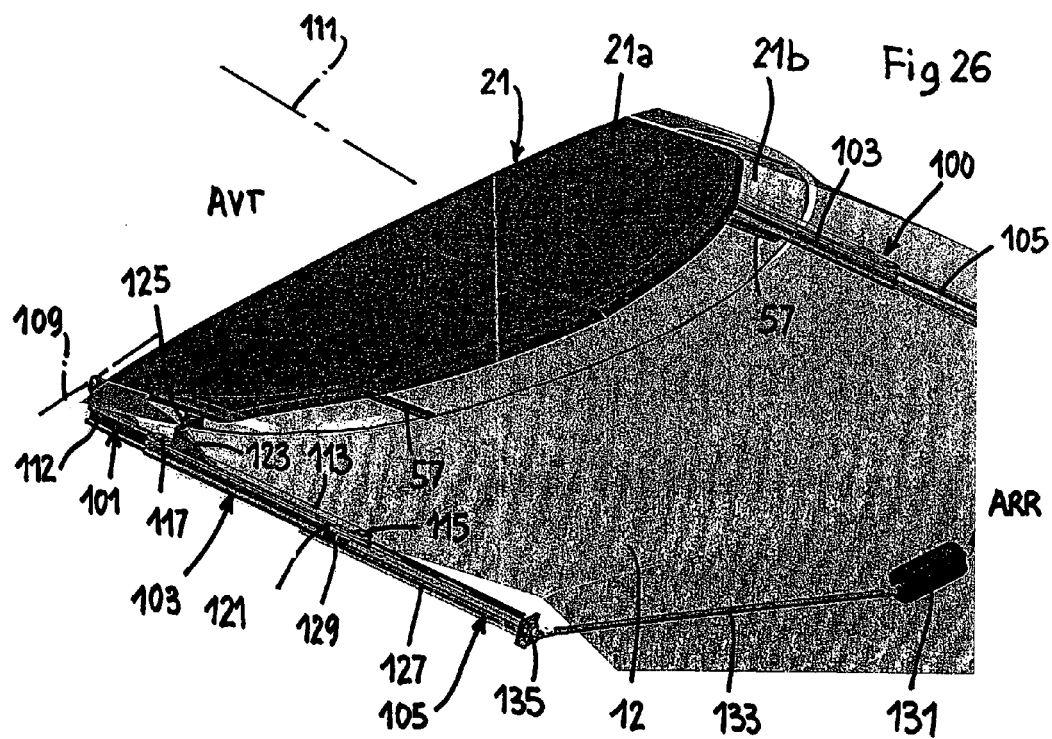

In the preferred example of FIGS. 25 and 26, a solution with a second dual axially sliding shelf 21, with a slide system is shown as a see-through view.

Each guiding unit laterally comprises, concealed under the hood 12, a telescopic slide 100 including three arms 101, 103, 105.

The first arm 101 is connected to the front (AVT) of the front component 21a of the second shelf 21, through the raised tab 107, along a jointed axis 109 perpendicular to the longitudinal axis 111 of the vehicle.

The second arm 103 is engaged with the first and third arms 101, 105, both through cooperating slides such as 112 and through a return pulley system 115, 117 and a cable 113 engaging with pads 119, 121 respectively fixed to said first and third arms so as to drive them into axial translation (111). The cooperating slides are located on both opposite faces of the arm 103 and on the face opposite the arms 101, 105.

Each arm 103 comprises a ramp playing the role of a cam 123 acting on a side pin 125 located toward the rear (ARR) of the front component 21a of the second shelf to cause the rear of this front component to pivot upwards, in an extended position toward the front of the second shelf (see FIG. 25).

Each third arm 105 is further engaged with the second arm 103 via a threaded rod 127 and nuts 129, and with a motor 131, via another rod 133 connected to a rack & pinion assembly 135.

Moreover, the front and rear components 21a, 21b of the second shelf 21 are slidably mounted relatively to each other along said longitudinal direction (22, 111) of the vehicle, for example as illustrated and described with reference to FIGS. 9 and 10 (rollers and slides 55, 56, 57).

It will further be noted that with the invention, it is possible to provide the first shelf 6 with a mat appearance on its upper face, whereas the second shelf 21 may be glossy, at least partially. This glossy treatment i.e. which generates a reflection in the sun, is acceptable since, in the closed condition of the roof, the second shelf 21 is retracted under the hood 12, with only the first shelf 6 being visible from the passenger compartment. With an open roof (convertible), there is no reflection problem on the rear window.

The invention claimed is:

1. A rear package shelf system for a convertible vehicle with a folding hard roof, said system comprising a first shelf adapted so as to cover in a normal position, a space located behind a back of corresponding seats, and means for moving said first shelf toward a retracted position in order to allow for a passage of roof components toward a folded position inside a rear trunk of the vehicle underneath a hood of said trunk, a second shelf attached to said hood underneath said hood and adapted so as to be positioned, in a position of a closed roof above a passenger compartment of the vehicle, entirely underneath said hood, and means for moving and guiding said second shelf toward a front of the vehicle in order to fill, in the folded position of the roof, the space between the back of the corresponding seats and a front edge of said hood, by protruding at least partly out of the hood.

2. The rear package shelf system according to claim 1, wherein the hood is adapted to pivot, at least partly, both toward the front and toward the rear, via front and rear pivot groups adapted to cause said hood to pivot from the rear to the front in order to access the inside of the trunk or from the front to the rear, respectively, in order to store the roof in at least one portion of said trunk, in a folded condition of the roof, the second shelf being attached to said hood, underneath said hood.

3. The rear package shelf system according to claim 1, wherein the first shelf is mounted so as to pivot downwards and rearwards around an axis located near its rear edge so as to be stored under a rear roof component when the roof is in said folded position.

4. The rear package shelf system according to claim 1, wherein the second shelf has, in a longitudinal direction of the vehicle, a larger dimension than a corresponding dimension of the hood of the rear trunk, the second shelf includes a front component and a rear component mobile relative to the front component so that the second shelf completely houses underneath said hood, and the system includes adapted means for moving the rear second shelf component relative to the front second shelf component when the second shelf is moved rearwards toward its stored position underneath the hood, and for putting back into place said rear second shelf component substantially aligned with the front second shelf component when the second shelf is moved forwards toward its extended position.

5. The rear package shelf system according to claim 4, wherein the rear second shelf component is pivotably or slidably mounted onto a rear end of the front second shelf component.

6. The rear package shelf system according claim 1, wherein the second shelf, on each side of the vehicle, is firmly attached to a carriage which moves along a respective guiding unit substantially extending longitudinally underneath the hood of the rear trunk.

7. The rear package shelf system according to claim 6, wherein the second shelf is mounted relative to each carriage via means adapted so as to allow an upward movement of the rear of the second shelf so as to be pressed against the front edge of the hood when the second shelf reaches its extended position.

8. The rear package shelf system according to claim 6, wherein each guiding unit is selected from the group consisting of a slide, a rack, and a rail, and is in one single piece or is of the telescopic type.

9. The rear package shelf system according claim 4, further comprising means for locking each of said second shelf components in the extended position of the second shelf.

10. The rear package shelf system according to claim 6, wherein each guiding unit comprises a first telescopic slide including three arms with a first arm attached to the front component of the second shelf, a second arm engaging with the first arm and with a third arm respectively via a cable attached to return pulleys and a threaded rod attached to nuts, the second arm comprising a cam acting on the front component of the second shelf to cause the rear of said front component to pivot upwards, in the front extended position of the second shelf, and the third arm being further engaged with a motorized driving means, via a rod attached to a rack and pinion assembly; and the front and rear components of the second shelf are slidably mounted one relative to the other along said longitudinal direction of the vehicle and along second slides.

11. The rear package shelf system according to claim 1, wherein the first shelf has a mat appearance on its upper face, and the second shelf is at least partly glossy.

12. A vehicle equipped with the rear package shelf system of claim 1.

* * * * *